US012771080B2

(12) United States Patent

Wang et al.

(10) Patent No.: US 12,771,080 B2

(45) Date of Patent: Oct. 20, 2026

(54) CONNECTOR FOR CONNECTING NEGATIVE TEMPERATURE COEFFICIENT THERMISTOR

(71) Applicant: TKK CO., LTD., Dongguan City (CN)

(72) Inventors: Ning Wang, Dongguan City (CN); Bing Shao, Dongguan City (CN); Pengfei Li, Dongguan City (CN)

(73) Assignee: TKK CO., LTD., Dongguan City (CN)

( * ) Notice: Subject to any disclaimer, the term of this patent is extended or adjusted under 35 U.S.C. 154(b) by 348 days.

(21) Appl. No.: 18/605,861

(22) Filed: Mar. 15, 2024

(65) Prior Publication Data

US 2025/0246858 A1 Jul. 31, 2025

(30) Foreign Application Priority Data

Jan. 30, 2024 (CN) ........................ 202420227869.9

(51) Int. Cl.
*H01R 13/66* (2006.01)
*H01R 12/71* (2011.01)

(52) U.S. Cl.
CPC ....... *H01R 13/6683* (2013.01); *H01R 12/716* (2013.01)

(58) Field of Classification Search
CPC .......................... H01R 13/6683; H01R 12/716
USPC ........................................................... 439/78
See application file for complete search history.

(56) References Cited

U.S. PATENT DOCUMENTS

| | | | | |
|---|---|---|---|---|
| 7,534,151 | B1 * | 5/2009 | Billerbeck | H01R 9/24 439/810 |
| 7,927,156 | B2 * | 4/2011 | Appel | H01R 12/515 439/709 |
| 8,961,201 | B2 * | 2/2015 | Griese | H01R 9/2675 439/121 |
| 10,312,003 | B2 * | 6/2019 | Chung | H01C 1/01 |
| 10,396,510 | B1 * | 8/2019 | Wagner | H01R 24/50 |
| 11,581,672 | B2 * | 2/2023 | Chen | H01R 12/7088 |
| 11,811,159 | B2 * | 11/2023 | Chen | H01R 11/09 |
| 11,909,136 | B2 * | 2/2024 | Chen | H01R 11/09 |
| 12,142,862 | B2 * | 11/2024 | Chen | H01R 11/09 |
| 12,476,400 | B2 * | 11/2025 | Xu | H01R 13/112 |
| 2019/0081311 | A1 * | 3/2019 | Zeng | H01R 12/774 |
| 2021/0351531 | A1 * | 11/2021 | Chen | H01R 12/7088 |
| 2022/0224032 | A1 * | 7/2022 | Chen | H01R 11/09 |

* cited by examiner

*Primary Examiner* — Harshad C Patel
(74) *Attorney, Agent, or Firm* — Leong C. Lei

(57) ABSTRACT

A connector for connecting a NTC (negative temperature coefficient) thermistor is disclosed. The connector comprises an insulating body and a conductive terminal. The insulating body has a receiving hole therein. The conductive terminal has a connecting portion extending outward. The connecting portion extends out of the insulating body. The connecting portion has a recess for a NTC thermistor to be embedded and attached to the recess, such that the NTC thermistor can detect the temperature inside the connector in time. Thus, the power can be cut off in time to avoid irreversible consequences of fire, and the NTC thermistor can be mounted and operated more easily.

10 Claims, 9 Drawing Sheets

CONNECTOR FOR CONNECTING NEGATIVE TEMPERATURE COEFFICIENT THERMISTOR

BACKGROUND OF THE INVENTION

1. Field of the Invention

The present invention relates to a connector, and more particularly to a connector for connecting a negative temperature coefficient thermistor.

2. Description of the Prior Art

Connectors are commonly-used electronic devices to realize the function of current or signal transmission through the contact of conductive terminals. The main structure of a conventional connector includes an insulating body and a conductive terminal. The insulating body has a receiving hole therein. The conductive terminal is disposed in the insulating body. The conductive terminal has a contact portion and a welding portion. The contact portion is located in the receiving hole. The welding portion extends out of the insulating body. The welding portion is used for electrical connection with an external circuit board. With the development of the digital information industry, the demand for digital signal transmission is increasing. In order to increase the transmission speed and reduce the size of related hardware devices, the specifications of the transmission interface are adjusted accordingly.

When in use, the conventional connector is not capable of detecting the ambient temperature using an NTC thermistor. Some connectors can detect the ambient temperature by providing a NTC thermistor on the insulating body. In this structure, the NTC thermistor is unable to detect the temperature inside the connector in time, resulting in irreversible consequences such as failure to disconnect the power in time or fire. Besides, in this way, the NTC thermistor is limited by the product structure. It is inconvenient to mount and operate the NTC thermistor. Therefore, it is necessary to improve the conventional connector.

SUMMARY OF THE INVENTION

In view of the deficiencies of the prior art, the primary object of the present invention is to provide a connector for connecting a negative temperature coefficient thermistor, which can effectively solve the problems that the NTC thermistor of the conventional connector cannot detect the temperature inside the connector in time and cannot be mounted and operated easily.

In order to achieve the above object, the present invention adopts the following solutions.

A connector for connecting a NTC (negative temperature coefficient) thermistor comprises an insulating body and a conductive terminal. The insulating body has a receiving hole therein. The conductive terminal is disposed in the insulating body. The conductive terminal has a contact portion and a welding portion. The contact portion is located in the receiving hole. The welding portion extends out of the insulating body. The conductive terminal further has a connecting portion extending outward. The connecting portion extends out of the insulating body. The connecting portion has a recess for a NTC thermistor to be embedded and attached to the recess.

Preferably, the connecting portion is in the form of an elongate plate. The recess is formed by stamping one side of the connecting portion, which is simple in structure, shaped easily and stable for installation.

Preferably, the connecting portion is fitted with a heat-shrinkable sleeve for securing the NTC thermistor, so as to ensure that the NTC thermistor is mounted stably and securely.

Alternatively, the connecting portion has holding arms that extend from two side edges of the connecting portion and are curved for holding and securing the NTC thermistor, so that the NTC thermistor can be secured more easily.

Preferably, the holding arms are arranged in two pairs for holding two ends of the NTC thermistor, so that the NTC thermistor are held better to prevent the NTC thermistor from falling off.

Preferably, the NTC thermistor is secured in the recess by welding.

Preferably, the receiving hole includes a plurality of receiving holes arranged side by side, and the conductive terminal includes a plurality of conductive terminals. The contact portions of the plurality of conductive terminals are located in the corresponding receiving holes, respectively. The welding portions of the plurality of conductive terminals extend out of the insulating body. The conductive terminals each have the connecting portion extending outward. The connecting portions of the plurality of conductive terminals extend out of the insulating body. The connecting portions of the plurality of conductive terminals are each formed with the recess for the NTC thermistor to be embedded and attached to the recess.

Preferably, the insulating body is of an integrated structure.

Alternatively, the insulating body includes a plurality of insulating blocks and an insulating cover. The plurality of insulating blocks and the insulating cover are arranged side by side in sequence and are secured by a snap-fit connection.

Preferably, the insulating block has an engaging hook that extends downward from a bottom of the insulating block and is engaged with an engaging hole of a circuit board, so that the insulation block can be mounted and secured to the circuit board quickly.

Compared with the prior art, the present invention has obvious advantages and beneficial effects. Specifically, it can be known from the above technical solutions:

The conductive terminal has the connecting portion extending outward, the connecting portion extends out of the insulating body, and the connecting portion is formed with the recess for the NTC thermistor to be embedded and attached to the recess, such that the NTC thermistor can detect the temperature inside the connector in time. Thus, the power can be cut off in time to avoid irreversible consequences of fire, and the NTC thermistor can be mounted and operated more easily.

Embodiments of the present invention will now be described, by way of example only, with reference to the accompanying drawings.

DETAILED DESCRIPTION OF THE PREFERRED EMBODIMENTS

Figure 1:
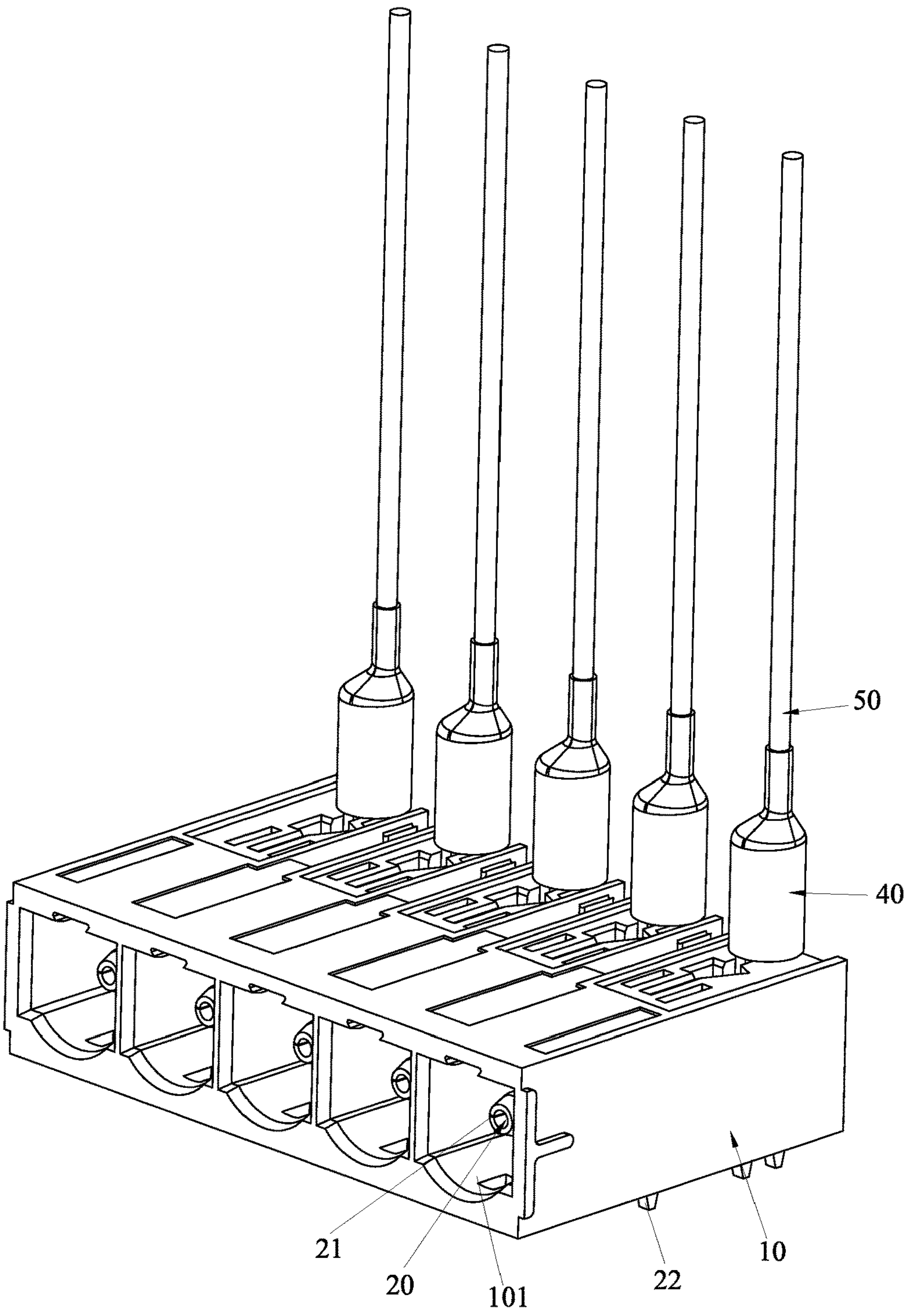
FIG. 1 is a perspective view according to a first embodiment of the present invention.
Figure 2:
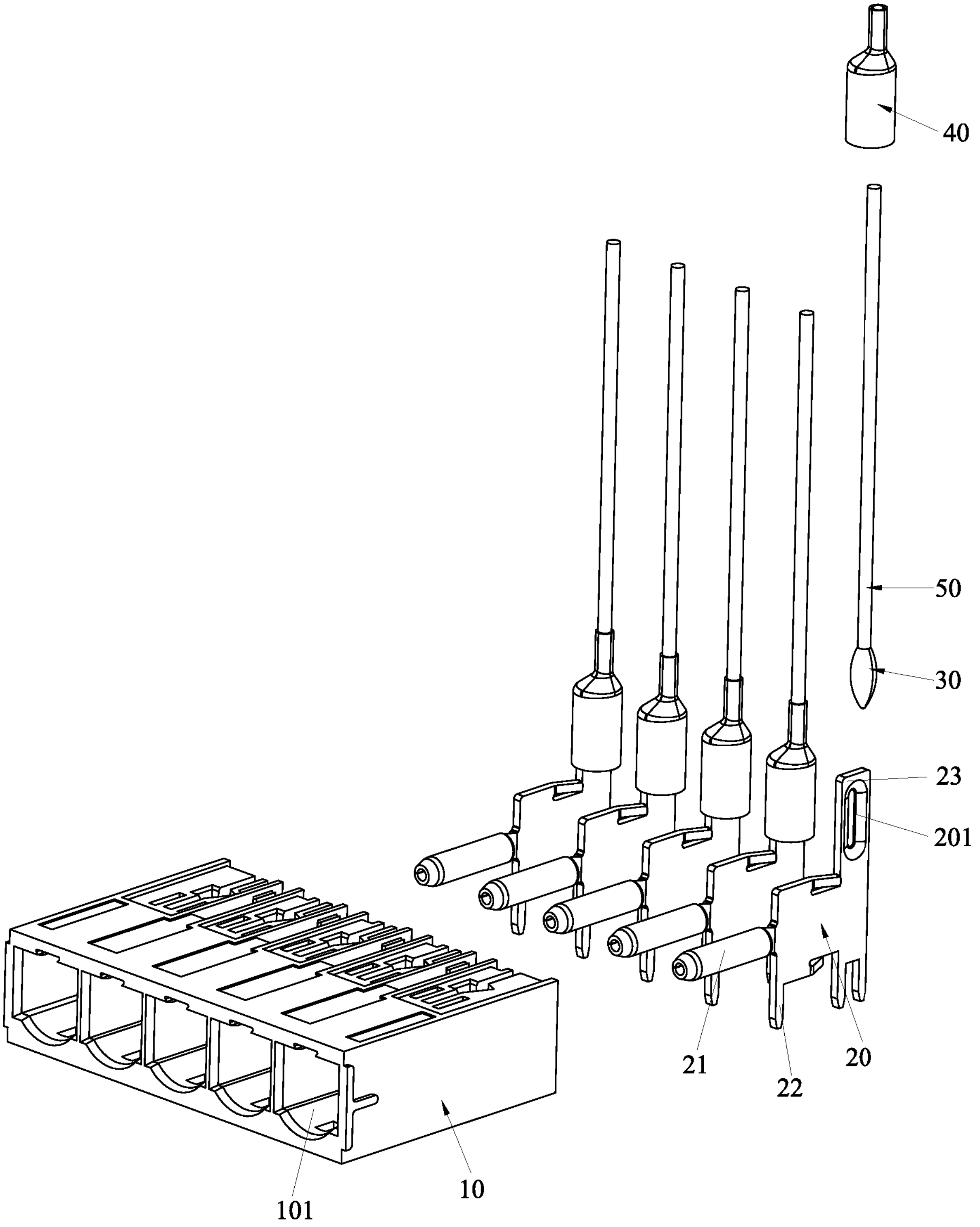
FIG. 2 is an exploded view according to the first embodiment of the present invention.
Figure 3:
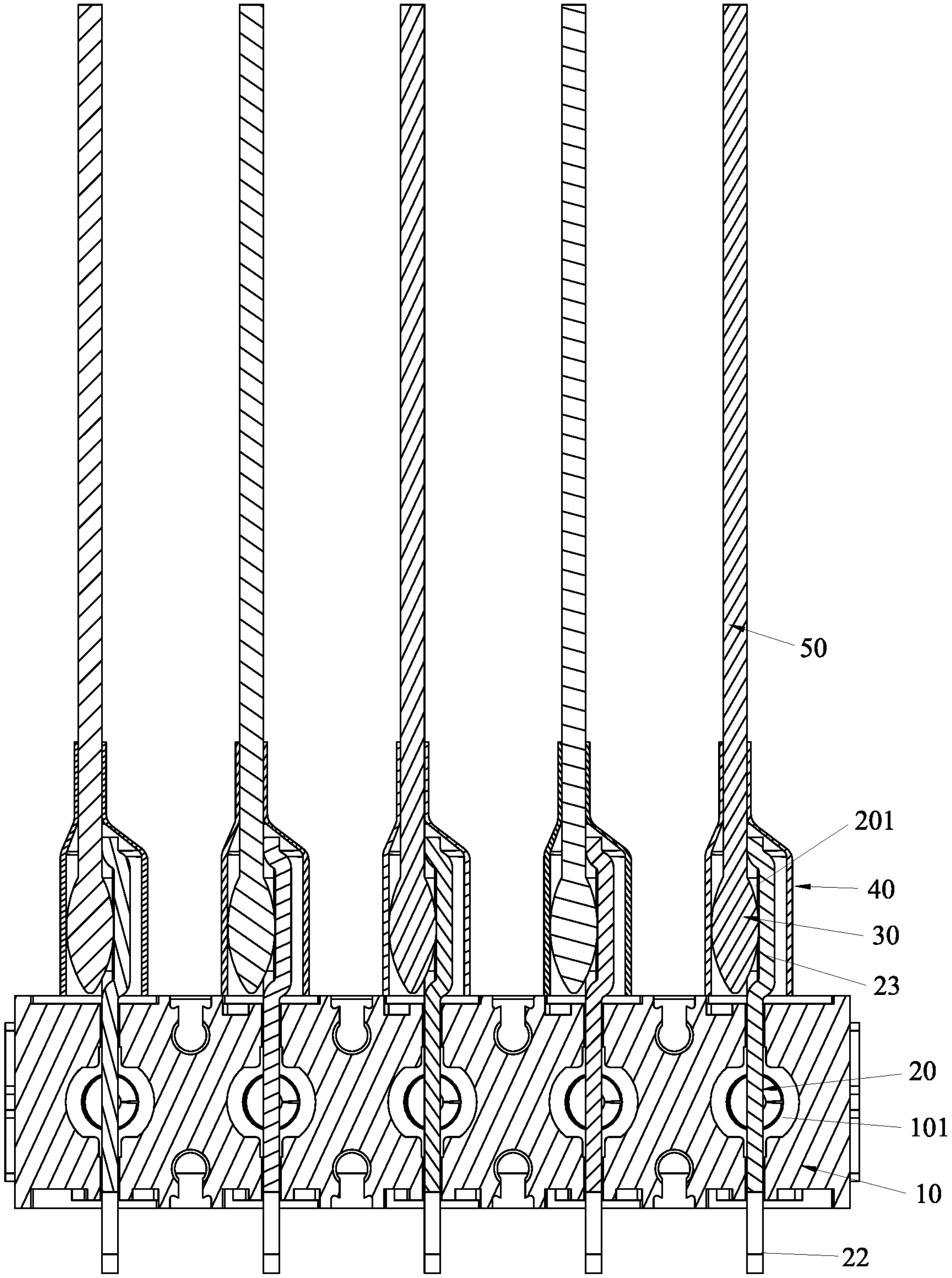
FIG. 3 is a cross-sectional view according to the first embodiment of the present invention.

FIG. 1, FIG. 2 and FIG. 3 illustrate the specific structure of the first embodiment of the present invention, comprising an insulating body 10 and a conductive terminal 20.

The insulating body 10 has a receiving hole 101 therein. In this embodiment, the insulating body 10 is of an integrated structure, and the structure is simple. The receiving hole 101 includes a plurality of receiving holes arranged side by side. The plurality of receiving holes 101 each have an opening facing forward.

The conductive terminal 20 is disposed in the insulating body 10. The conductive terminal 20 has a contact portion 21 and a welding portion 22. The contact portion 21 is located in the receiving hole 101. The welding portion 22 extends out of the insulating body 10. The conductive terminal 20 further has a connecting portion 23 extending outward. The connecting portion 23 extends out of the insulating body 10. The connecting portion 23 has a recess 201 for a NTC (negative temperature coefficient) thermistor 30 to be embedded and attached to the recess 201, so that the NTC thermistor 30 can detect the ambient temperature stably when the connector is working. In this embodiment, the conductive terminal 20 includes a plurality of conductive terminals. The contact portions 21 of the plurality of conductive terminals 20 are located in the corresponding receiving holes 101, respectively. The welding portions 22 of the plurality of conductive terminals 20 extend out of the insulating body 10. The plurality of conductive terminals 20 each have the connecting portion 23 extending outward. The connecting portions 23 of the plurality of conductive terminals 20 extend out of the insulating body 10. The connecting portions 23 of the plurality of conductive terminals 20 are each formed with the recess 201 for the NTC thermistor 30 to be embedded and attached to the recess 201. In this way, multiple wire connections are formed, thereby providing more connection channels. The contact portion 21 has a cylindrical shape and extends in a front-to-back direction. The contact portion 21 is formed by curling. The contact portion 21 is located at the center of the receiving hole 101. The welding portion 22 extends downward and extends out of the bottom of the insulating body 10. The welding portion 22 includes a plurality of welding portions arranged at intervals in the front-to-back direction. The connecting portion 23 extends upward from the top of the rear end of the insulating body 10. The connecting portion 23 is in the form of an elongate plate. The recess 201 is formed by stamping one side of the connecting portion 23, and the recess 201 corresponds in shape to the NTC thermistor 30, which is simple in structure, shaped easily and stable for installation. The connecting portion 23 is fitted with a heat-shrinkable sleeve 40 for securing the NTC thermistor 30, so as to ensure that the NTC thermistor 30 is mounted stably and securely.

The assembly of the first embodiment is detailed as follows:

First, the insulating body 10 and the conductive terminals 20 are made and prepared. Next, the conductive terminals 20 are connected in the insulating body 10 from back to front. Then, the heat-shrinkable sleeve 40 is fitted onto the NTC thermistor 30 to which a connecting wire 50 is connected. Next, the NTC thermistor 30 is embedded in the recess 201, and the heat-shrinkable sleeve 40 wraps the NTC thermistor 30 and the outside of the connecting portion 23. Finally, the heat-shrinkable sleeve 40 is heated so that the heat-shrinkable sleeve 40 shrinks to wrap around the NTC thermistor 30 and the connecting portion 23 tightly. Thus, the NTC thermistor 30 and the connecting portion 23 are secured together.

Figure 4:
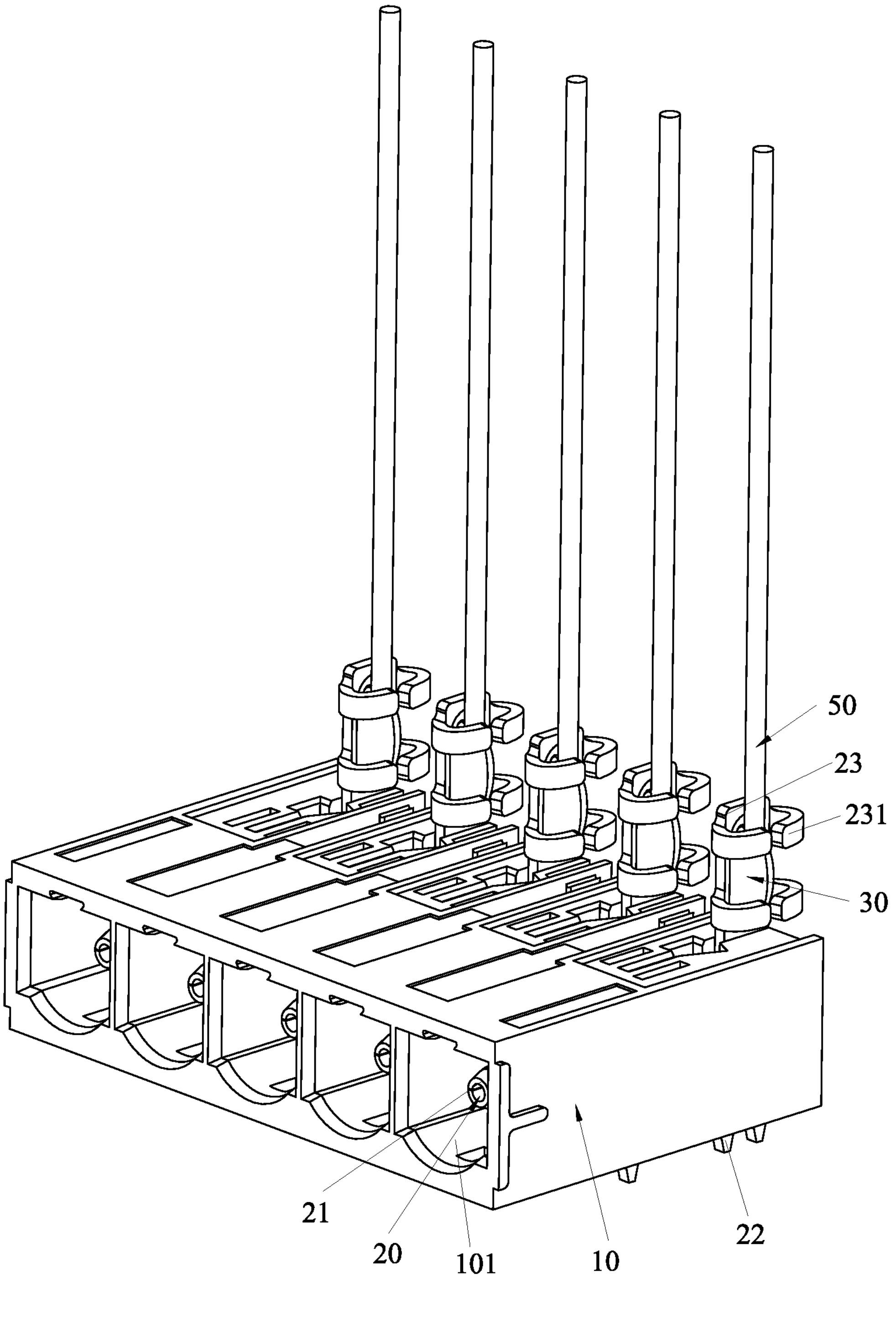
FIG. 4 is a perspective view according to a second embodiment of the present invention.
Figure 5:
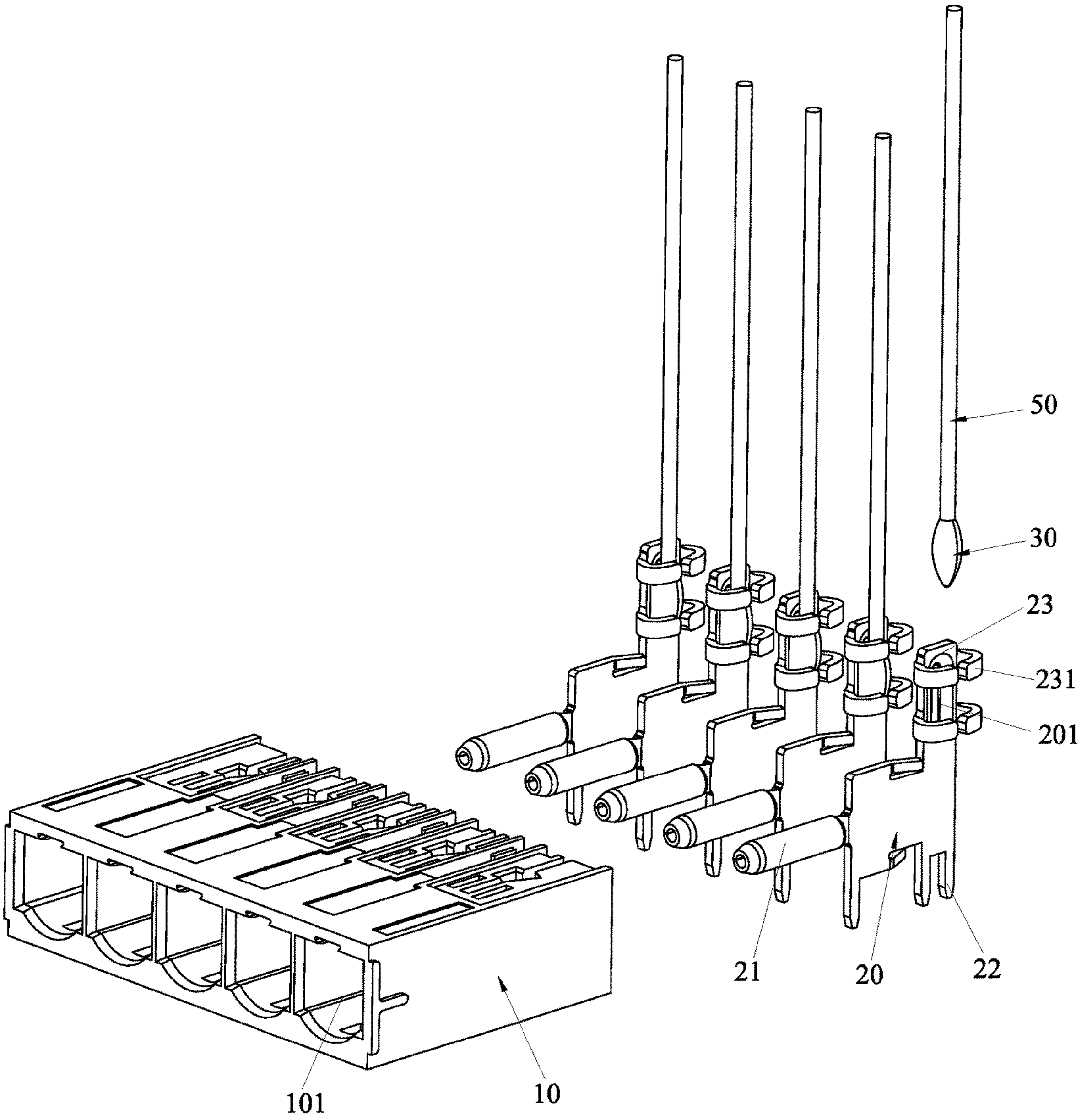
FIG. 5 is an exploded view according to the second embodiment of the present invention.
Figure 6:
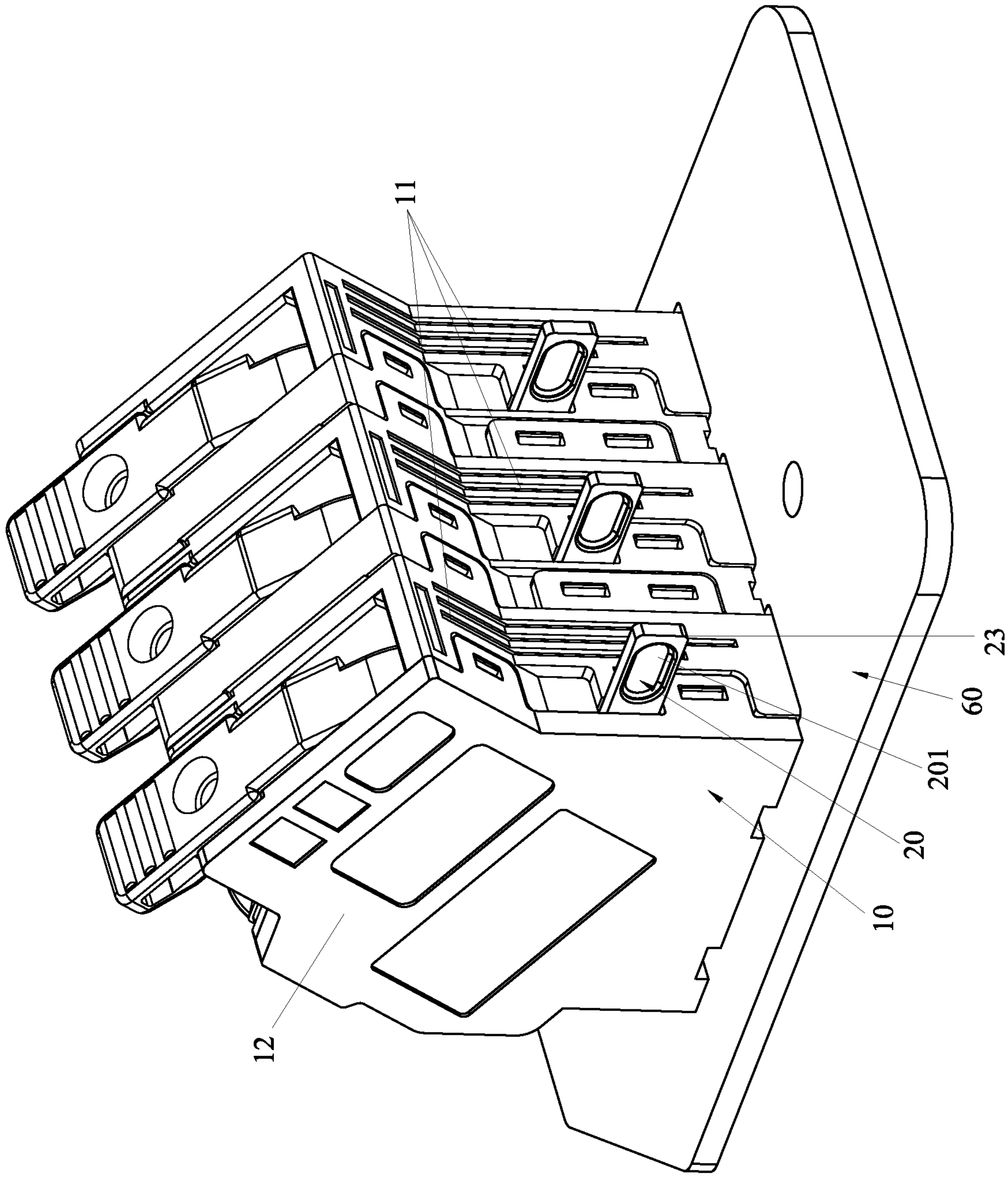
FIG. 6 is a perspective view according to a third embodiment of the present invention.
Figure 7:
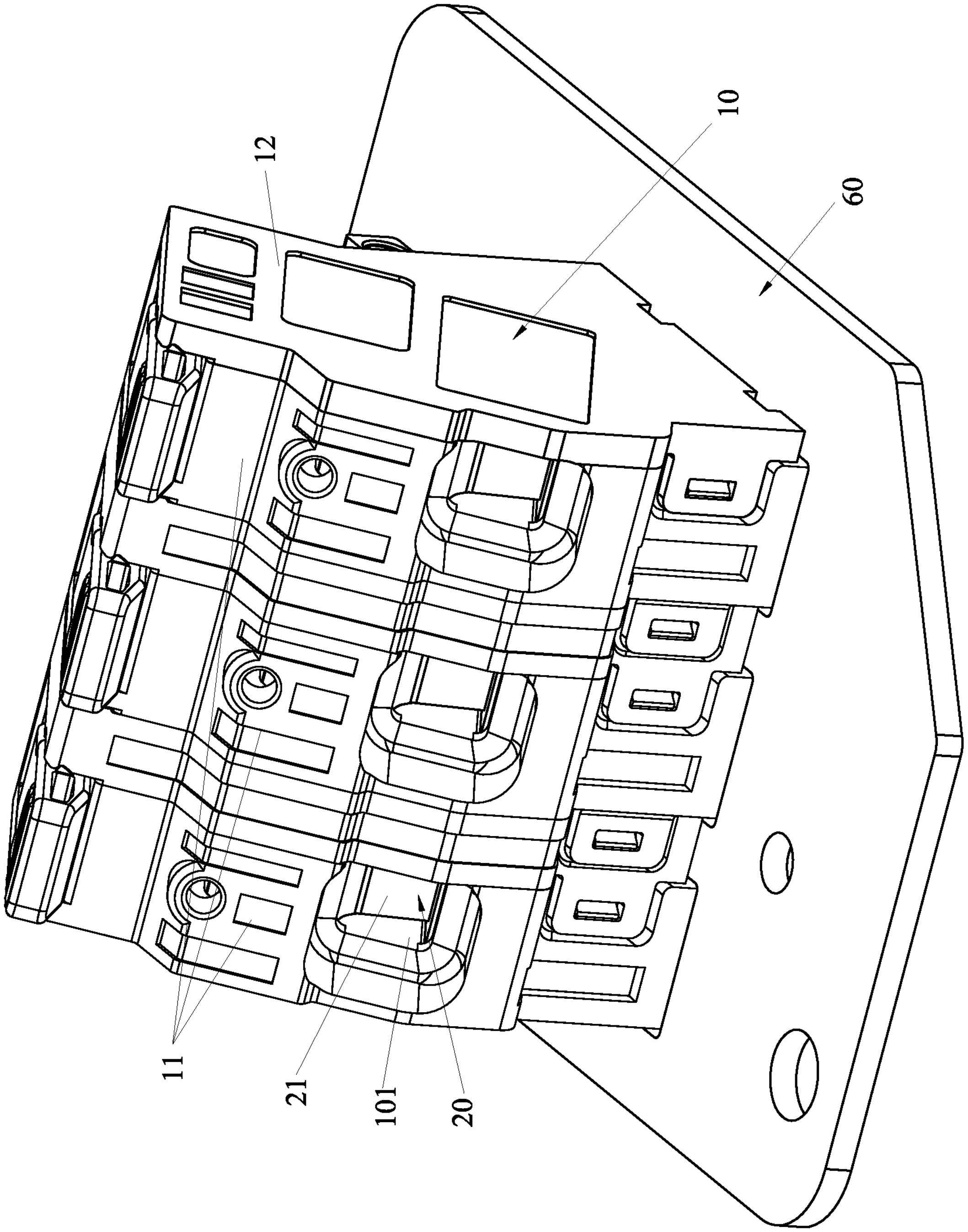
FIG. 7 is another perspective view according to the third embodiment of the present invention.
Figure 8:
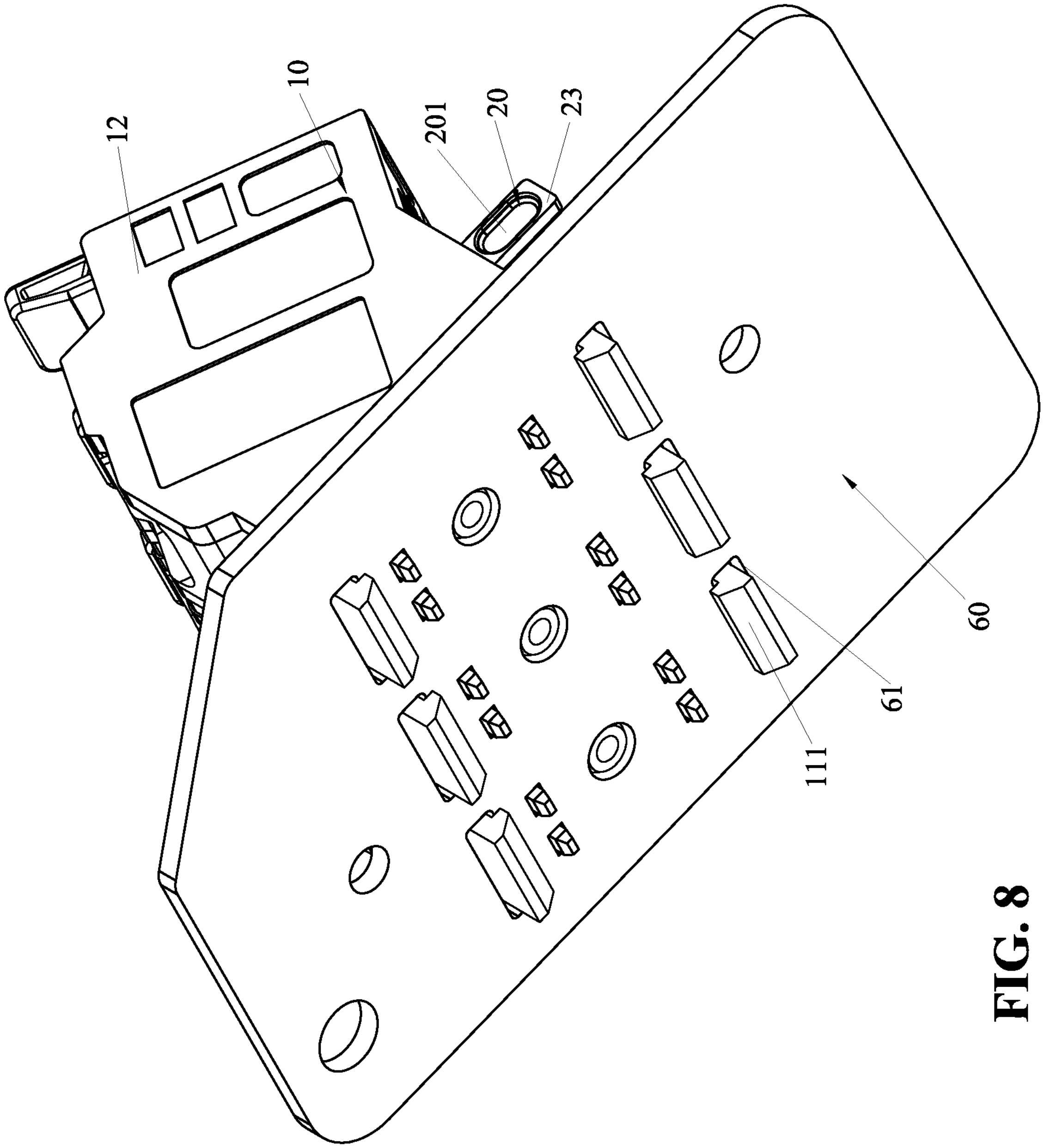
FIG. 8 is a further perspective view according to the third embodiment of the present invention.
Figure 9:
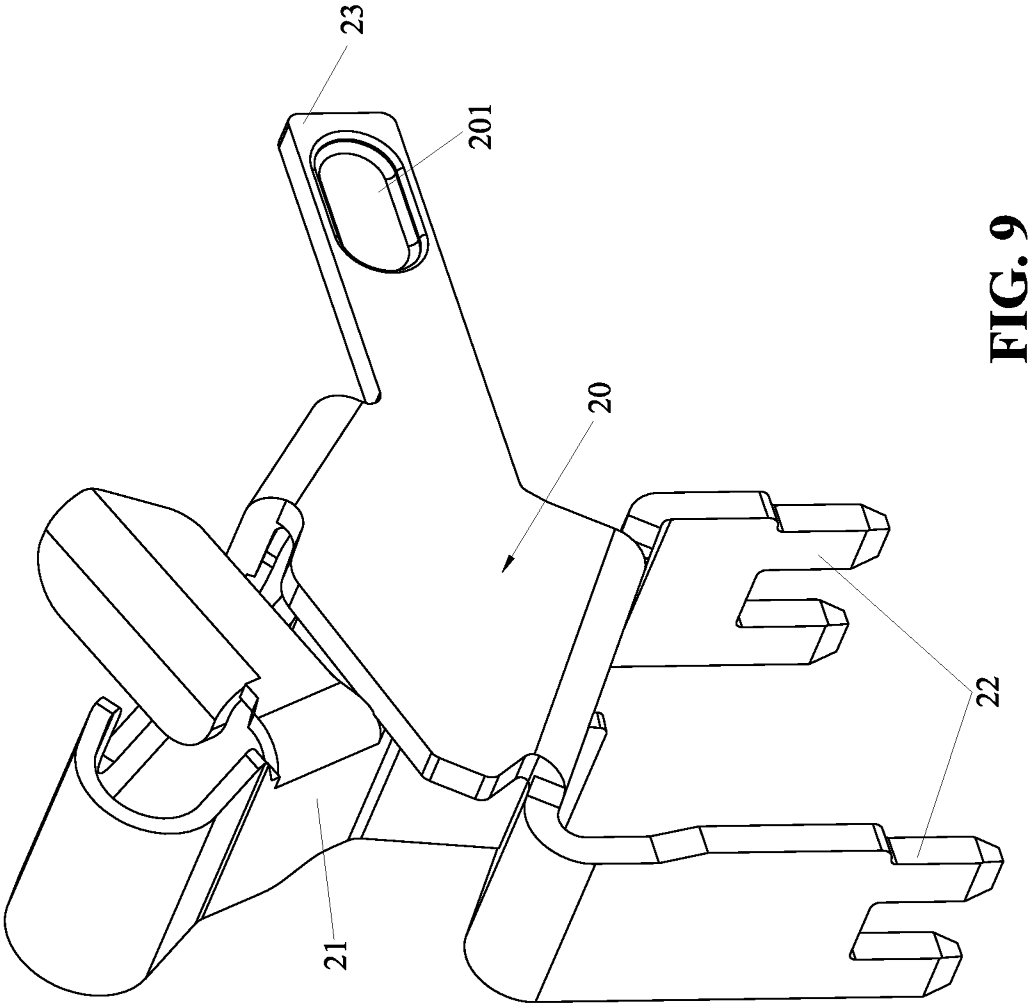
FIG. 9 is an enlarged view of the conductive terminal according to the third embodiment of the present invention.

FIG. 4 and FIG. 5 illustrate the specific structure of the second embodiment of the present invention. The second embodiment is substantially similar to the first embodiment with the exceptions described hereinafter.

In this embodiment, the connecting portion 23 has holding arms 231 that extend from two side edges of the connecting portion 23 and are curved for holding and securing the NTC thermistor 30, so that the NTC thermistor 30 can be held easily. Moreover, the holding arms 231 are arranged in two pairs for holding two ends of the NTC thermistor 30. In this way, the NTC thermistor 30 can be held better, so as to prevent the NTC thermistor 30 from falling off. The NTC thermistor 30 may be secured in the recess 201 by welding, but not limited thereto.

The assembly of the second embodiment is detailed as follows:

First, the insulating body 10 and the conductive terminals 20 are made and prepared. Next, the conductive terminals 20 are connected in the insulating body 10 from back to front. Next, the NTC thermistor 30 connected with the connecting wire 50 is embedded in the recess 201. Then, the holding arms 231 are curved to hold and secure the NTC thermistor 30.

FIG. 6 through FIG. 9 illustrate the specific structure of the third embodiment of the present invention. The third embodiment is substantially similar to the first embodiment with the exceptions described hereinafter.

In the third embodiment, the insulating body 10 includes a plurality of insulating blocks 11 and an insulating cover 12. The plurality of insulating blocks 11 and the insulating cover 12 are arranged side by side in sequence and are secured by a snap-fit connection. The structure is simple and the assembly is easy. The insulating block 11 has an engaging hook 111 that extends downward from the bottom of the insulating block 11 and is engaged with an engaging hole 61 of a circuit board 60, so that the insulation block 11 can be mounted and secured to the circuit board 60 quickly. The receiving hole 101 faces forward and inclines upward. The number of the receiving holes 101 is three, and the number of the conductive terminals 20 is three. In addition, the connecting portion 23 extends rearward and extends out of the insulating body 10.

The assembly of the third embodiment is essentially the same as that of the first embodiment described above, and the assembly of the third embodiment will not be described in detail hereinafter.

The feature of the present invention is that the conductive terminal has the connecting portion extending outward, the connecting portion extends out of the insulating body, and the connecting portion is formed with the recess for the NTC thermistor to be embedded and attached to the recess, such that the NTC thermistor can detect the temperature inside the connector in time. Thus, the power can be cut off in time to avoid irreversible consequences of fire, and the NTC thermistor can be mounted and operated more easily.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A connector, comprising an insulating body and a conductive terminal; the insulating body having a receiving hole therein, the conductive terminal being disposed in the insulating body, the conductive terminal having a contact portion and a welding portion, the contact portion being located in the receiving hole, the welding portion extending out of the insulating body, the conductive terminal further having a connecting portion extending outward, the connecting portion extending out of the insulating body, the connecting portion has a recess for a NTC (negative temperature coefficient) thermistor to be embedded and attached to the recess.

2. The connector as claimed in claim 1, wherein the connecting portion is in the form of an elongate plate, and the recess is formed by stamping one side of the connecting portion.

3. The connector as claimed in claim 1, wherein the connecting portion is fitted with a heat-shrinkable sleeve for securing the NTC thermistor.

4. The connector as claimed in claim 1, wherein the connecting portion has holding arms that extend from two side edges of the connecting portion and are curved for holding and securing the NTC thermistor.

5. The connector as claimed in claim 4, wherein the holding arms are arranged in two pairs for holding two ends of the NTC thermistor.

6. The connector as claimed in claim 1, wherein the NTC thermistor is secured in the recess by welding.

7. The connector as claimed in claim 1, wherein the receiving hole includes a plurality of receiving holes arranged side by side, the conductive terminal includes a plurality of conductive terminals, the contact portions of the plurality of conductive terminals are located in the corresponding receiving holes respectively, the welding portions of the plurality of conductive terminals extend out of the insulating body, the conductive terminals each have the connecting portion extending outward, the connecting portions of the plurality of conductive terminals extend out of the insulating body, and the connecting portions of the plurality of conductive terminals are each formed with the recess for the NTC thermistor to be embedded and attached to the recess.

8. The connector as claimed in claim 1, wherein the insulating body is of an integrated structure.

9. The connector as claimed in claim 1, wherein the insulating body includes a plurality of insulating blocks and an insulating cover, and the plurality of insulating blocks and the insulating cover are arranged side by side in sequence and are secured by a snap-fit connection.

10. The connector as claimed in claim 9, wherein the insulating block has an engaging hook that extends downward from a bottom of the insulating block and is engaged with an engaging hole of a circuit board.

* * * * *